United States Patent [19]

Yoshimura et al.

[11] Patent Number: 4,747,053

[45] Date of Patent: May 24, 1988

[54] ELECTRONIC DICTIONARY

[75] Inventors: Motokazu Yoshimura, Nagoya; Tsuyoshi Nishibu, Anpachi; Seiko Ishikawa, Hekinan, all of Japan

[73] Assignee: Brother Kogyo Kabushiki Kaisha, Aichi, Japan

[21] Appl. No.: 863,798

[22] Filed: May 16, 1986

[30] Foreign Application Priority Data

May 20, 1985 [JP] Japan .................................. 60-108847
May 20, 1985 [JP] Japan .................................. 60-108848

[51] Int. Cl.$^4$ .............................................. G06F 15/38
[52] U.S. Cl. ...................................... 364/419; 364/900
[58] Field of Search ............... 364/419, 200, 900, 518; 434/156, 157, 169

[56] References Cited

U.S. PATENT DOCUMENTS

| 4,218,760 | 8/1980 | Levy | 364/419 |
|---|---|---|---|
| 4,438,505 | 3/1984 | Yanagiuchi | 364/419 |
| 4,439,836 | 3/1984 | Yoshida | 364/419 |
| 4,584,667 | 4/1986 | Hashimoto | 364/419 |
| 4,590,560 | 5/1986 | Sado | 364/419 |
| 4,611,995 | 9/1986 | Sado | 364/419 |

Primary Examiner—Michael R. Fleming
Attorney, Agent, or Firm—Parkhurst & Oliff

[57] ABSTRACT

An electronic dictionary in which a plurality of word data each representing an English word are stored in a predetermined order and each word data comprises a data division and an additional division. Each data division includes a combination of one or more parts among a first compressed part, a second compressed part and a third compressed part; the first compressed part being a code indicating the number of first characters that are common between an English word represented by the corresponding word data and the English word whose corresponding word data is stored just before the word data in the electronic dictionary; the second compressed part being a code indicating a suffix which appears in English words, and the third compressed part being a sequence of codes each representing each alphanumerical character not represented by a first or second part code. Each additional division includes a code for identifying the combination of the compressed parts of each word data; and a delimiter division which includes a delimiter code for indicating the ending place of the word data.

7 Claims, 8 Drawing Sheets

FIG. 3

| NUMBER OF COMMON CHARACTERS | BIT PATTERN | | | | | |
|---|---|---|---|---|---|---|
| 4 | 0 | 0 | 0 | | | |
| 3 | 0 | 0 | 1 | | | |
| ⋮ | ⋮ | ⋮ | ⋮ | ⋮ | ⋮ | ⋮ |
| 17 | 1 | 1 | 1 | 0 | 0 | 0 |

FIG. 4

| CHARACTERS | BIT PATTERN | | | | | | | | | |
|---|---|---|---|---|---|---|---|---|---|---|
| ion | 0 | 0 | 0 | | | | | | | |
| ing | 0 | 0 | 1 | | | | | | | |
| ⋮ | ⋮ | ⋮ | ⋮ | ⋮ | ⋮ | ⋮ | ⋮ | ⋮ | ⋮ | ⋮ |
| ism | 1 | 1 | 1 | 1 | 1 | 1 | 1 | 0 | 1 | 0 |
| her | 1 | 1 | 1 | 1 | 1 | 1 | 1 | 0 | 1 | 1 |

FIG. 5

| CHARACTER | BIT PATTERN | | | | | | | | | | | | |
|---|---|---|---|---|---|---|---|---|---|---|---|---|---|
| DELIMITER | 0 | 0 | 0 | | | | | | | | | | |
| DELIMITER | 0 | 0 | 1 | | | | | | | | | | |
| e | 0 | 1 | 0 | | | | | | | | | | |
| i | 0 | 1 | 1 | 0 | | | | | | | | | |
| ⋮ | ⋮ | ⋮ | ⋮ | ⋮ | ⋮ | ⋮ | ⋮ | ⋮ | ⋮ | ⋮ | ⋮ | ⋮ | ⋮ |
| / | 1 | 1 | 1 | 1 | 1 | 1 | 1 | 1 | 1 | 1 | 0 | 0 | 0 |
| x | 1 | 1 | 1 | 1 | 1 | 1 | 1 | 1 | 1 | 1 | 0 | 0 | 1 |

DELIMITER CODE

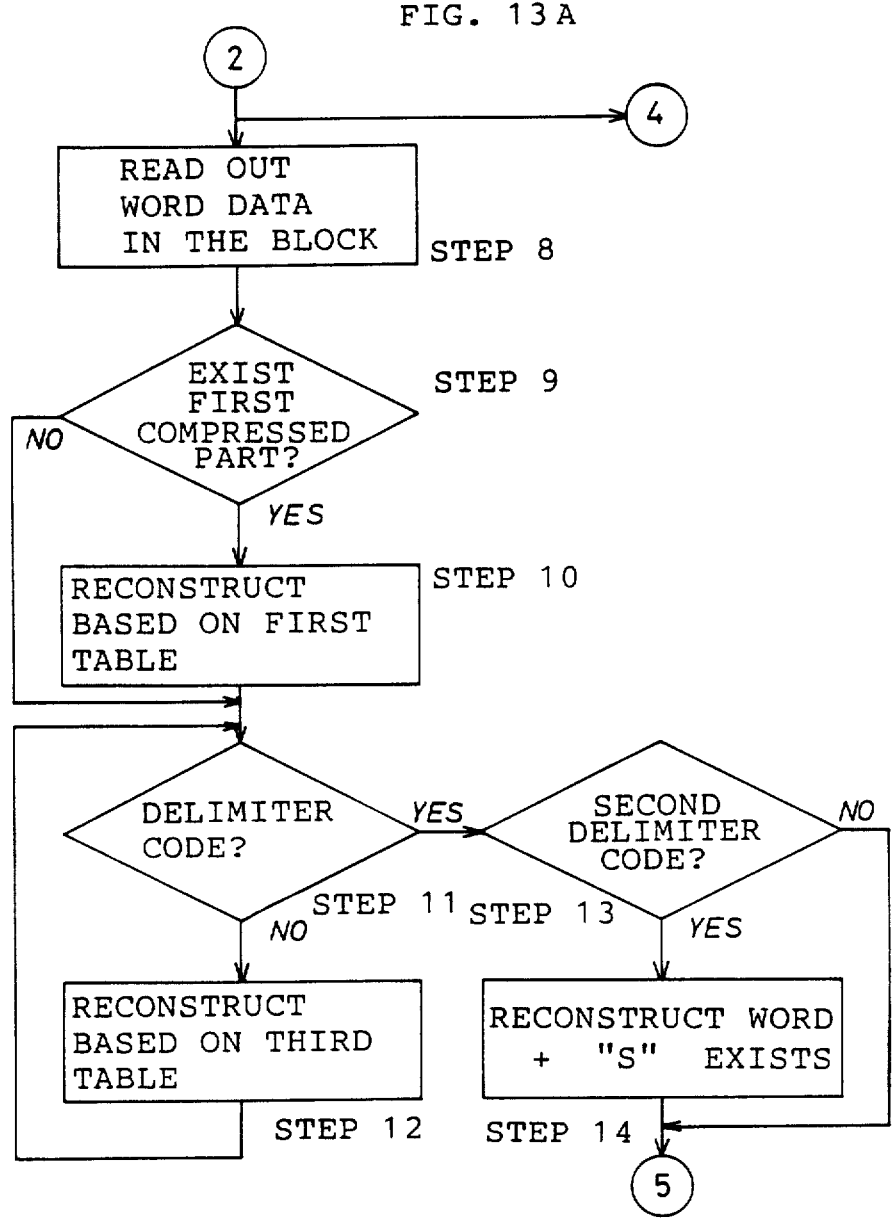

ELECTRONIC DICTIONARY

BACKGROUND OF THE INVENTION

1. Technical Field

The present invention relates to an electronic dictionary installed in a word processor, and more particularly to a construction of an electronic dictionary for storing as many words as possible.

2. Prior Art

Generally, an electronic dictionary has a dictionary memory in which a large number of English word data has been previously stored for spelling check. One byte of the memory storage capacity is required to represent one character of each word data with ASCII code. When an English word is inputted from a keyboard, a central processing unit, hereinafter referred to as CPU, searches to determine if a word data coincident with the input word exists in the dictionary memory. If a coincident word data does not exist in the dictionary memory, the input word is flickered on a cathode ray tube, hereinafter referred to as a CRT, to inform an operator that the input word may be misspelt.

However, in the electronic dictionary described above, since each English word and inflections of the word are separately stored, the number of bytes of the dictionary memory corresponding to a sum total of the number of characters of each word is required. Thus, the storage capacity of the dictionary memory necessarily must be enlarged in order to store a great number of word data in the dictionary memory, which increases the manufacturing cost.

SUMMARY OF THE INVENTION

Accordingly, an object of this invention is to provide an electronic dictionary which stores as many words as possible in the restricted storage capacity of the dictionary memory.

In order to achieve this and other objects, an electronic dictionary is proposed, in which a plurality of word data each representing an English word are stored in a predetermined order and each word data comprises: a data devision which includes a combination of one or more parts among a first compressed part, a second compressed part and a third compressed part, the first compressed part being a code indicating the number of first characters that are common between an English word represented by the corresponding word data and the English word whose corresponding word data is stored just before the word data in the electronic dictionary, the second compressed part being a code indicating a suffix which appears in English words, and the third compressed part being a sequence of codes each representing each alphanumerical character; an additional devision which includes a code for identifying the combination of the compressed parts of each word data; and a delimiter devision which includes a delimiter code for indicating the ending place of the word data.

In a word processor having the electronic dictionary explained above, when an English word is inputted by an input means, a read-out means reads out a word data from the dictionary memory and reconstructs an original English word based on the compressed parts and the additional code of the word data. A check means determines if the input English word coincides with the reconstructed English word and an output means displays the check result on the CRT.

BRIEF DESCRIPTION OF DRAWINGS

The invention may be best understood by reference to the following detailed description of a preferred embodiment and accompanying drawings, wherein like reference numerals denote like elements, in which:

FIG. 3 is a schematic diagram showing the contents of the first conversion table in the embodiment of FIG. 2;

FIG. 4 is a schematic diagram showing the contents of the second conversion table in the embodiment of FIG. 2;

FIG. 5 is a schematic diagram showing the contents of the third conversion table in the embodiment of FIG. 2;

FIGS. 12, 13A and 13B are flowcharts illustrating processing steps performed by the word processor of the embodiment.

DETAILED DESCRIPTION OF PREFERRED EMBODIMENT

A preferred embodiment of the present invention will be described in detail with reference to the accompanying drawings.

Figure 1:
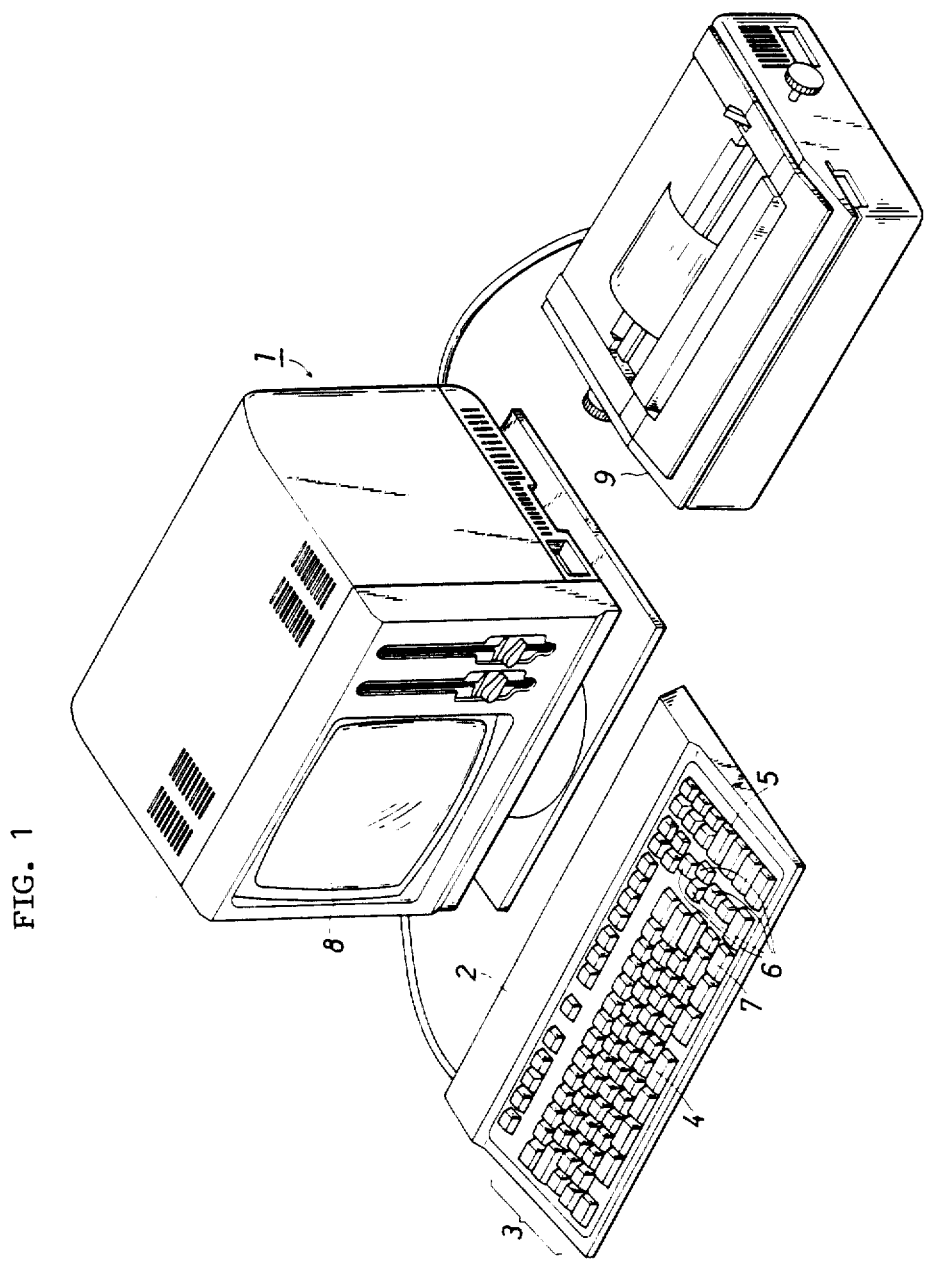
FIG. 1 is a perspective view of a word processor embodying this invention.

Referring now to the drawings, and more particularly to FIG. 1, a word processor 1 having an electronic dictionary according to this invention includes a keyboard 2 whereon a number of character keys 3 and a space key 4 are installed as an input means. When the character keys 3 are operated, the corresponding character data such as alphabets or numerals are selected and inputted. A correction key 5 and cursor keys 6 disposed on the rightside of the character keys 3 are utilized with the character keys 3 to correct a misinputted word. A select key 7 disposed on the underside of the correction key 5 is utilized to change a misinput word into a correct one inputted through the operation of the correction key 5 and the character keys 3. A CRT 8, an output device, placed on the backside of the keyboard 2 displays, and a printer 9 placed on the side of the CRT 8 prints out, English words or numerals inputted by the character keys 3, respectively.

Figure 2:
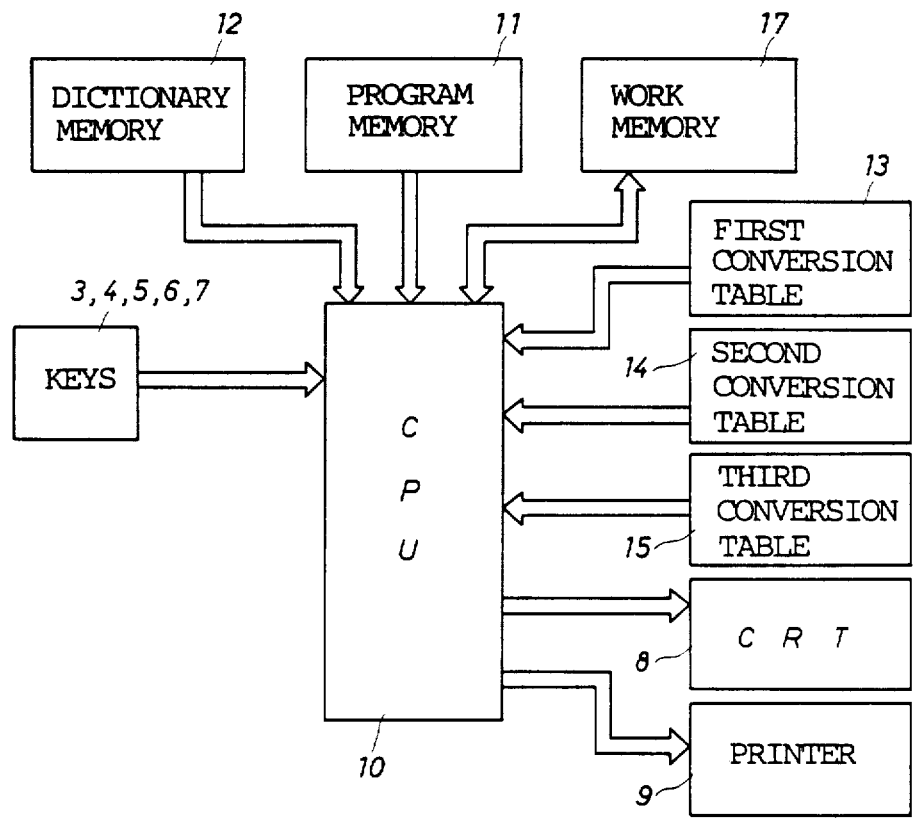
FIG. 2 is a block diagram showing an electronic construction of an embodiment according to this invention.

Referring to FIG. 2, the electronic construction of the abovementioned word process 1 is illustrated. Character data inputted through the operation of the keys are transmitted to a CPU 10 having an output function, a read-out function and a check function, and in response to these signals, the CPU 10 displays the characters on the CRT 8.

A program memory 11connected to the CPU 10 is embodied by a Read Only Memory, hereinafter referred to as ROM, wherein a prescribed program for operating the word processor is stored.

A dictionary memory 12 connected to the CPU 10 is embodied by a ROM, wherein a large number of English words are stored as word data in alphabetic order. Each character of a word is converted into a specific bit pattern based on a conversion code stored in a third conversion table described below and is stored. If first characters are common between an English word represented by the corresponding word data and the English word whose corresponding word data is stored immediately before the word data, the number of the common characters is converted into a specific bit pattern based on a conversion code stored in a first conversion table described below and is stored in the dictionary memory. If the suffix of a word is one of the suffixes which frequently appear in English words and is stored in a second conversion table described below, the suffix is converted into a specific bit pattern based on a conversion code stored in the second conversion table and is stored.

The first conversion table 13 stored in a ROM is connected to the CPU 10. When the first characters of an English word data stored in the dictionary memory 12 are common with those of an English word data stored immediately before the word data, the number of the common characters is converted into a specific bit pattern. The numbers and the corresponding bit patterns are stored in the first conversion table 13 in order of highest frequency. As shown in FIG. 3, a bit pattern composed of three bits "000" represents a number "4" which appears most frequently as the number of the first common characters, and a bit pattern "001" represents a number "3" which appears next most frequently apart from "4". In the same manner, each specific bit pattern is set to represent each of the numbers of the common characters in order of next highest frequency. While the numbers of the common characters appear less frequently, the numbers of the bits of the corresponding patterns increase so as not to generate an identical part between any two of the bit patterns. Thus, each character is stored in a small storage capacity and also the judgment by the CPU 10 is performed promptly.

The second conversion table 14 stored in a ROM is connected to the CPU 10. Suffixes which frequently appear in English words stored in the dictionary memory 12 are converted into specific bit patterns. The suffixes and the corresponding bit patterns are stored in the second conversion table 14 in order of highest frequency. As shown in FIG. 4, a bit pattern composed of three bits "000" represents a suffix "ion" which appears most frequently in English words stored in the dictionary memory 12, and the bit pattern "001" represents a suffix "ing" which appears next most frequently apart from "ion". In the same manner, each specific bit pattern is set to represent each of the suffixes in order of next highest frequency. While the suffixes appear less frequently, the numbers of bits of the corresponding patterns increase so as not to generate an identical part between any two of the bit patterns. Thus, each character is stored in a small storage capacity and also the judgment by the CPU 10 is performed promptly.

The third conversion table 15 stored in a ROM is connected to the CPU 10. Each of the characters composing English words stored in the dictionary memory 12, i.e. each of the 26 letters of the English alphabet and other characters, is converted into a specific bit pattern. Each character and the corresponding bit pattern are stored in the third conversion table 15 in order of highest frequency. As shown in FIG. 5, a bit pattern composed of three bits "010" represents a character "e" which appears most frequently in English words, and a bit pattern "0110" represents a character "i" which appears next most frequently apart from "e". In the same manner, each specific bit pattern is set to represent each of characters in order of next highest frequency. While the characters appear less frequently, the numbers of bits of the corresponding patterns increase so as not to generate an identical part between any two of the bit patterns. Thus, each character is stored in a small storage capacity and also the judgment by the CPU 10 is performed promptly.

As shown in FIG. 5, in the first part of the third conversion table 15, a first delimiter code and a second delimiter code are stored as a bit pattern "000" and a pattern "001", respectively. The first delimiter code constitutes delimiting information stored immediately after a bit pattern based on the third conversion table 15 in the dictionary memory 12. The second delimiter code is a specific code showing that the inflection of a word which has been previously stored in the dictionary memory 12, e.g., the inflection which has a suffix "s", exists. By using the second delimiter code, it becomes unnecessary to separately store the inflection of the word.

Each of a plurality of English word data stored in the dictionary memory 12 is composed of three divisions, i.e., a word division, an additional division and a delimiter division. In the word devision, the combination of bit patterns based on the three conversion tables 13, 14 and 15, are stored. In the additional division, one of the additional codes composed of two bits, "00", "01", "10" or "11", is stored in accordance with the combination of bit patterns. In the delimiter division, either of the two delimiter codes is stored.

Figure 6:
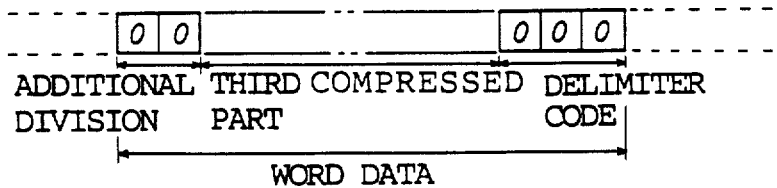
FIGS. 6 thru 10 are schematic diagrams showing the construction of each word data in the dictionary memory in the embodiment of FIG. 2.

An English word data, all characters of which are converted into bit patterns based on the third conversion table 15 and are stored, has an additional code "00" in the first part of the word data, as shown in FIG. 6. Bit patterns corresponding to each character of the word data are stored in succession as the third compressed part after the additional code. The first delimiter code "000" follows the third compressed part and a following word data is stored after the first delimiter code.

Figure 7:
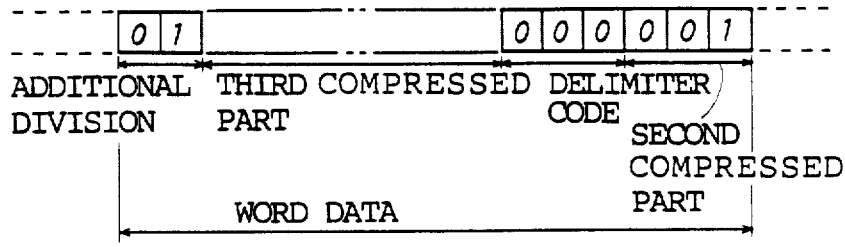

An English word data which has a suffix "ing" stored in the second conversion table 14 such as "abiding", has an additional code "01" in the first part of the word data, as shown in FIG. 7. Bit patterns which are based on the third conversion table 15 and which correspond to each character of the word except the suffix "ing", i.e. each character of "abid", are stored in succession as the third compressed part after the additional code. The first delimiter code "000" follows the third compressed part and the bit pattern which is based on the second conversion table 14 and which corresponds to the suffix "ing" follows the first delimiter code.

Figure 8:
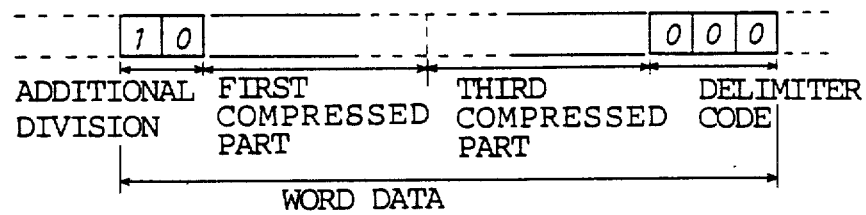

An English word data, e.g. "abnormality", the first characters of which are common with the first characters of a word data, e.g. "abnormal", stored immediately before the word data, e.g. "abnormality", has an additional code "10" in the first part of the word data, as shown in FIG. 8. A bit pattern which is based on the first conversion table 13 and which corresponds to the number of the common characters is stored as the first compressed part after the additional code. The bit patterns which are based on the third conversion table 15 and which correspond to each character of the word data except the first common part, i.e. each character of "ity", are stored in succession as the third compressed part after the first compressed part and the first delimiter code "000" follows the third compressed part.

Figure 9:
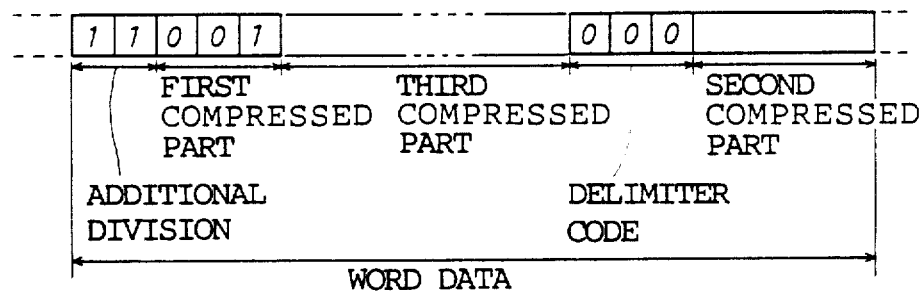

An English word data, e.g. "abolish", the first characters of which are common with the first characters of a word data, e.g. "aboard", stored immediately before the word data, e.g. "abolish", and which has a suffix "ish" stored in the second conversion table 14, has an additional code "11" in the first part of the word data, as shown in FIG. 9. A bit pattern which is based on the first conversion table 13 and which corresponds to the number of the common characters is stored as the first compressed part after the additional code. In this example, the bit pattern "001" is stored for representing the number of the first common characters, 3. A bit pattern which is based on the third conversion table 15 and which corresponds to the character of the word other than the suffix and the first common part, i.e. the character "i", is stored as the third compressed part after the first compressed part. The first delimiter code "000" follows the third compressed part and a bit pattern which is based on the second conversion table 14 and which corresponds to the suffix "ish" follows the first delimiter code.

Figure 10:
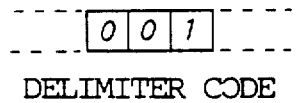

When the plural form, e.g. "desks", of an English word is intended to be stored with the singular word, e.g. "desk", the second delimiter code "001" instead of the first delimiter code is stored in the singular form of the word data, as shown in FIG. 10, and the word data representing the word, "desks", is omitted. The inflection of a verb, which has a suffix "s", is stored in the dictionary memory 12 in the same manner as the inflection of a noun described above.

Figure 11:
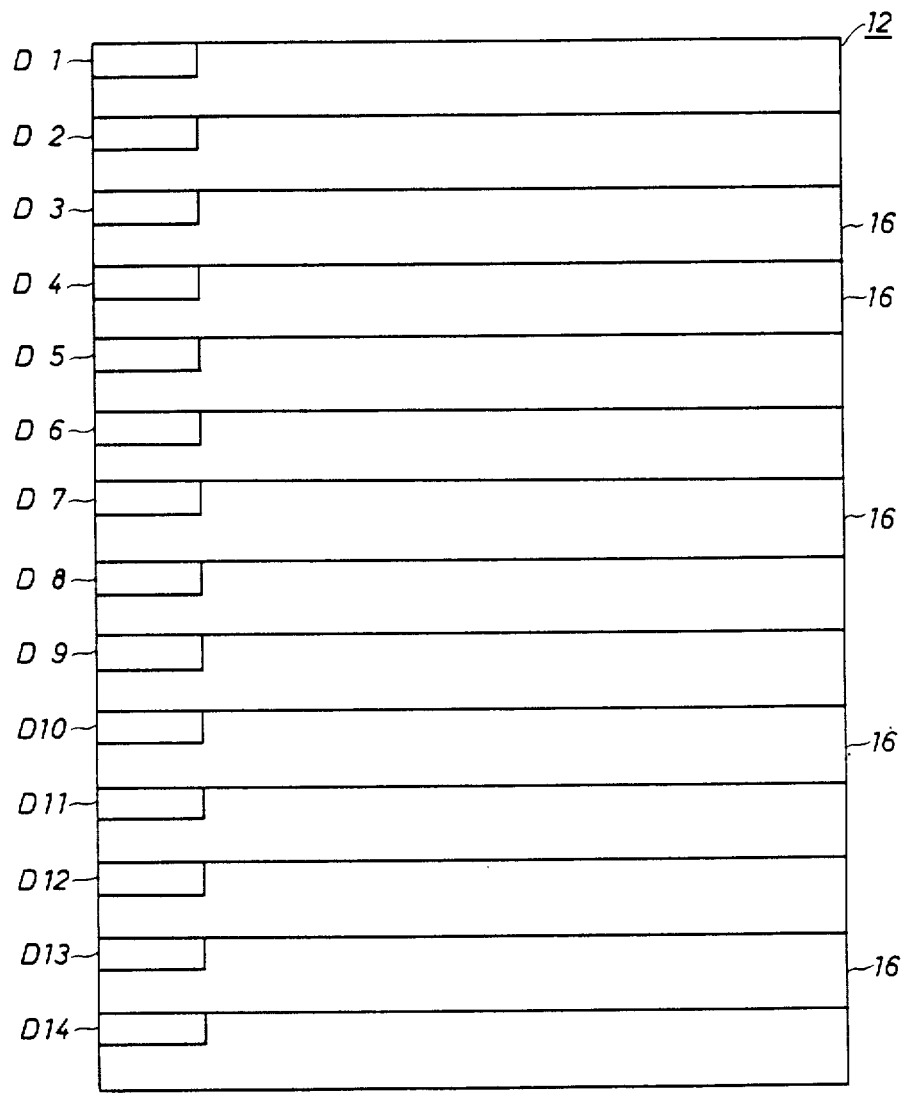
FIG. 11 is a schematic diagram showing the contents of the dictionary memory in the embodiment of FIG. 2.

A plurality of word data, which are stored in alphabetic order in the dictionary memory 12 as described above, are divided into a plurality of blocks 16 in the dictionary memory 12, as shown in FIG. 11. The word data stored in the first of each block is referred to as the first data, D, hereinafter. Each character of the first data is converted and compressed by the third conversion table 15. When the CPU 10 searches the word data in the dictionary memory 12, the first data D1 thru D14 are initially searched by a so-called binary search method. Namely, when a word is inputted by the character keys 3 and the space key 4, the CPU 10 first reads out the first data D7 which is stored in the center of the dictionary memory 12 to compare it with the input word, and determines if the input word is located before the first data D7 or after D7. If the CPU 10 determines that the input word is located before D7, the CPU 10 reads out the first data D4 which is stored in the center of the first half of the dictionary memory 12 to compare it with the input word, and determines if the input word is located before the first data D4 or after D4. By this binary search means, the CPU 10 reads out one after another the first data D1 thru D14 and compares them with the input word to determine the block 16 which is expected to include the input word. Word data of this block 16 are read out successively and are reconstructed by using at least one of the abovementioned conversion tables 13, 14 and 15 so as to compare them with the input word.

A work memory 17 connected to the CPU 10 is embodied by a Random Access Memory (RAM), wherein a word data inputted by the character keys 3 and the space key 4 and transmitted to the CPU 10 is stored. The CPU 10 determines if the word data corresponding to an inputted English word exists in the dictionary memory 12. If the inputted word is determined not to exist, the inputted word is flickered on the CRT 8 to inform an operator that the input word may be misspelt.

Figure 12:
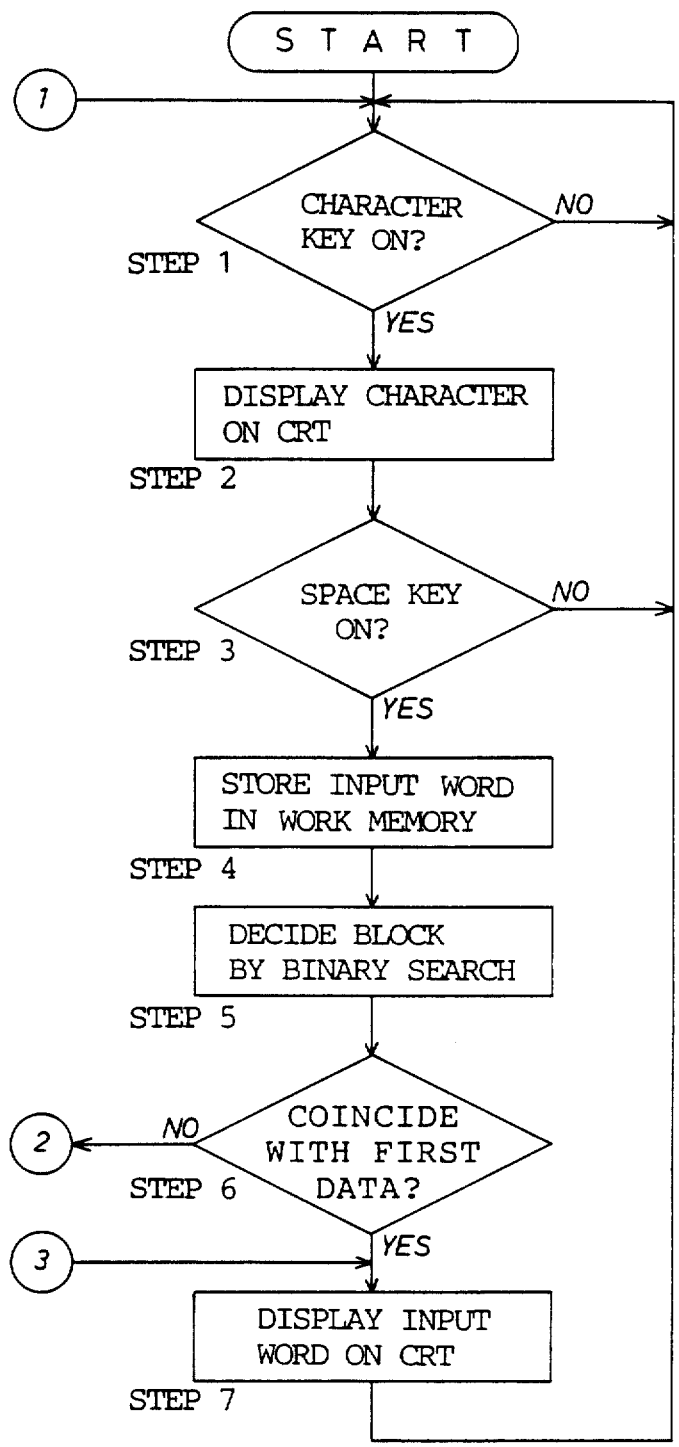
Figure 13B:
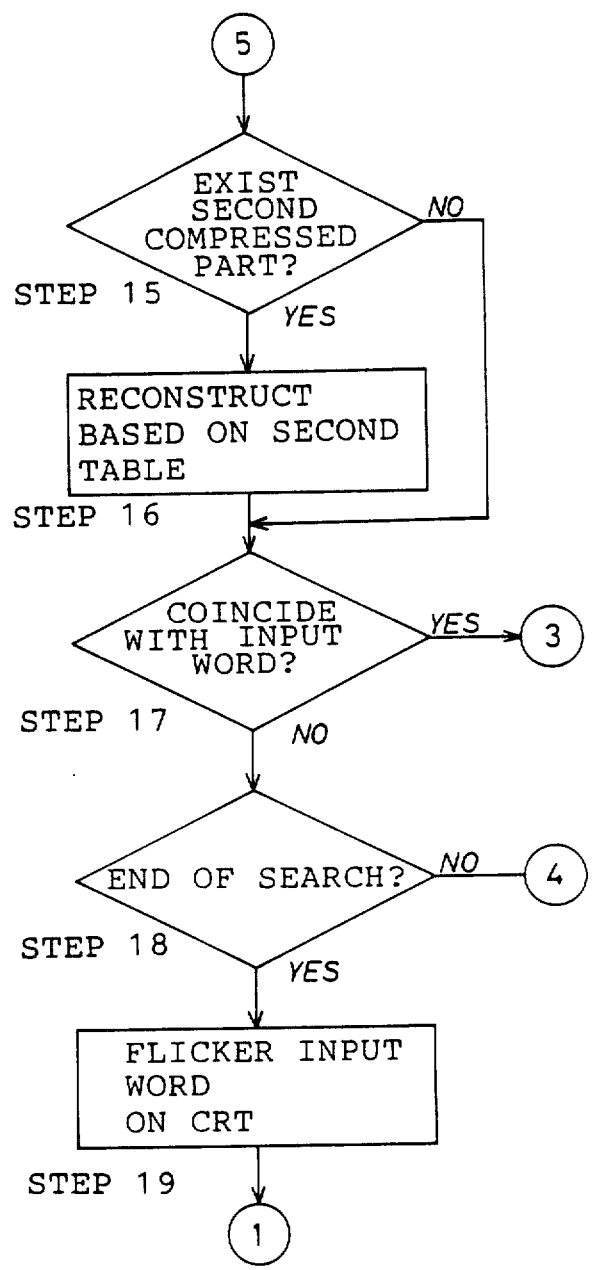

Referring now to FIGS. 12, 13A and 13B, the processing steps performed by the word processor will be illustrated.

In FIG. 12, while the CPU 10 waits for the operation of various keys on the keyboard 2, if alphanumeric characters are inputted by the character keys 3 at step 1, the CPU 10 displays successively the characters on the CRT 8 at step 2. After a desired English word is inputted by the character keys 3, the space key 4 is pressed to leave a fixed space between the word and the successive word at step 3. Thus, the CPU 10 recognizes a series of the input characters as a word and stores the word in the work memory 17 at step 4. The CPU 10 compares the input word with word data stored in the dictionary memory 12 one by one to determine if the coincident word data with the input word exists in the dictionary memory 12. If the CPU 10 determines that the input word exists in the dictionary memory 12, the CPU 10 displays the word on the CRT 8 as it is and waits for another operation of the character keys 3.

The processing steps described above will be explained in detail. After storing an inputted English word in the work memory 17, at step 5, the CPU 10 reads out one after another the first data D1 thru D14 of each block 16 in the dictionary memory 12 in the manner described previously to compare them with the inputted word so as to determine the block 16 in which the word data corresponding to the input word is expected to exist. The program proceeds to a decision point 6 where it is determined if word data coincident with the inputted word exists amongst the first data D1 thru D14. If it exists, at step 7 the CPU 10 displays the input word on the CRT 8 as it is and waits for another operation of the character keys 3 at step 1.

However, if coincident word data does not exist amongst the first data D1 thru D14, the CPU 10 reads out one by one the word data stored in the block 16 in which the word data corresponding to the inputted word is expected to exist. Each word data are reconstructed to an English word based on at least one of the three conversion tables 13, 14 and 15 and are compared with the inputted word. These processing steps will be described in detail with reference to FIGS. 13A and 13B.

At step 8, the CPU 10 reads out word data stored in the abovementioned block 16 one by one in alphabetic order, i.e., the word data located immediately after the first data of the block 16 is next read out. The combination of the compressed parts based on at least one of the three conversion tables 13, 14 and 15 are determined in accordance with the additional code stored in the first two bits of the word data, as described above.

If a read-out word data has an additional code "00", as shown in FIG. 6, the CPU 10 determines that the first compressed part based on the first conversion table 13 does not exist after the additional code of the word data at step 9. At step 11, the CPU 10 determines that a delimiter code does not exist after the additional code. At step 12, each English character is reconstructed with the corresponding bit pattern by the third conversion table 15. Each bit pattern is successively reconstructed to each English character until a delimiter code appears. When a delimiter code appears, the CPU 10 determines, at step 11, that a delimiter code exists; a step 13, that the delimiter code is not the second but the first delimiter code; and at step 15, that the second compressed part does not exist after the first delimiter code by the additional code "00", and compares the reconstructed word with the input word at step 17.

If a read-out word data has an additional code "01", as shown in FIG. 7, the CPU 10 determines that the first compressed part based on the first conversion table 13 does not exist after the additional code of the word data at step 9. At step 11, the CPU 10 determines that a delimiter code does not exist after the additional code. Each English character is reconstructed with the corresponding bit pattern by the third conversion table 15 at step 12. Each bit pattern is successively reconstructed to each English character until a delimiter code appears. When a delimiter code appears, the CPU 10 determines at steps 11 and 13, that the delimiter code is the first delimiter code and at step 15, determines that the second compressed part exists after the first delimiter code according to the additional code "01". At step 16, a suffix is reconstructed with the corresponding bit pattern by the second conversion table 14 and at step 17, compares the reconstructed word with the input word.

If a read-out word data has an additional code "10", as shown in FIG. 8, the CPU 10 determines that the first compressed part based on the first conversion table 13 exists after the additional code of the word data at step 9. At step 10, first characters of the word data which are common with those of a word data stored immediately before the word data, are reconstructed with the corresponding bit pattern by the first conversion table 13. At step 11, the CPU 10 determines that a delimiter code does not exist after the first compressed part. Each English character is reconstructed with the corresponding bit pattern by the third conversion table 15 at step 12. Each bit pattern is successively reconstructed to each English character until a delimiter code appears. When a delimiter code appears, the CPU 10 determines, at step 11, that a delimiter code exists; at step 13, that the delimiter code is not the second but the first delimiter code; and at step 15, that the second compressed part does not exist after the first delimiter code according to the additional code "10" and compares the reconstructed word with the inputted word at step 17.

If a read-out word data has an additional code "11" as shown in FIG. 9, the CPU 10 reconstructs the first compressed part and the third compressed part by using the first and the third conversion tables 13 and 15 at steps 9, 10, 11 and 12, in the same manner as the word data which has the additional code "10". Determining that the first delimiter code exists after the third compressed part at steps 11 and 13, the CPU 10 reconstructs the second compressed part by using the second conversion table 14 in accordance with the additional code "11" at steps 15 and 16 and compares the reconstructed word with the inputted word at step 17.

If a word data read out has the second delimiter code showing that the word represented by the word data can have a suffix "s", the CPU 10 determines that the word data has not the first but the second delimiter code at steps 11 and 13. Recognizing, at step 14, that an English word made by adding a suffix "s" to the reconstructed word exists, the CPU 10 compares both the reconstructed word and the reconstructed word with the added suffix "s" with the inputter word, at step 17.

In this manner, word data of the block 16 in the dictionary memory 12 are reconstructed to English words successively and are compared with the input word. If a reconstructed word coincides with the input word, the CPU 10 displays the inputted word on the CRT 8 as it is at step 7 and waits for another operation of the character keys 3 at step 1. If a reconstructed word does not coincide with the inputted word, the CPU 10 determines if word data, which have not been searched yet, exist in the block 16. If such word data is determined to exist, the word data are successively read out to be reconstructed to English words in the same manner described above and are compared with the input word. At steps 17 and 18, if it is determined that a word data coincident with the input word does not exist, the CPU 10 flickers with input word on the CRT 8 at step 19 and waits for another operation of the character keys 3 at step 1.

An inputted English word which is determined not exist in the dictionary memory 12 by the CPU 10 is flickered on the CRT 8. If the word is misspelt, cursor keys 6 select the word, a correction key 5 and character keys 3 correct the spelling of the word and a select key 7 changes the misspelt word into the correctly spelt word to store in the work memory 17. If the flickered word is not misspelt, the cursor keys 6 select the word and the select key 7 stores the input word in the work memory 17 as it is.

As described above, in the word processor 1 of the embodiment of the invention, if first characters of an English word data are common with first characters of a word data stored immediately before the word data in the dictionary memory 12, the number of the common characters are converted into a specific bit pattern by the first conversion table 13. If a word data has one of the suffixes which frequently appear in English words, the suffix is converted into a specific bit pattern by the second conversion table 14. Other parts of a word data, i.e. characters of a word data other than a suffix or common characters, are converted into bit patterns by the third conversion table 15. When an English word data, which is made by adding a suffix "s" to the original form of a word data is stored in the dictionary memory 12, the word data has the second delimiter code instead of the first delimiter code.

When an English word is inputted from the keyboard 2, the CPU 10 successively reads out word data of the dictionary memory 12 so as to determine if a word data corresponding to the inputted word exists in the dictionary memory 12 and reconstructs English words by using at least one of the three conversion tables 13, 14 and 15 to compare them with the inputted word.

Accordingly, compared with the conventional dictionary memory in which each character of an English word is converted into an ASSCII code or the like, a greater number of word data can be stored in the smaller storage capacity of the dictionary memory 12 in the embodiment of this invention. Especially, when the inflection of a word, i.e. a word made by adding a suffix "s" to the original form of the word, is stored, the second delimiter code composed of three bits is merely stored in the word data of the original form instead of the first delimiter code to show the existence of the inflection. Thus, the storage capacity of the dictionary memory can be used more efficiently and store a greater number of word data in the dictionary memory.

The electronic dictionary is readily applicable to a well-known expansible dictionary to which an operator can add a word when the word processor warns it does not exist in the dictionary memory. In such a word processor, a decoder, which decomposes and decodes the word into the word data, as described above, using the conversion tables, is installed together with other components.

The foregoing description of a preferred embodiment is for the purpose of illustrating this invention and is not to be considered as limiting or restricting this invention since many modifications may be made by the exercise of ordinary skill in the art without departing from the scope of this invention.

What is claimed is:

1. An electronic dictionary system which comprises:
   an electronic dictionary memory in which a plurality of word data each representing a word are stored in a predetermined order, and each word data comprises a data division and an additional division,
   said data division for each word data containing a combination of one or more compressed parts selected from among a first compressed part, a second compressed part and a third compressed part, the first compressed part being selected from a first set of codes indicating the number of first characters that are common between the word corresponding to the word data and the word corresponding to the preceding word data stored in the electronic dictionary, the second compressed part being selected from a second set of codes indicating a suffix which appears in the word, and the third compressed part being a sequence of codes selected from a third set of alphanumeric codes, and the sequence of codes respectively representing each alphanumeric character of the corresponding word whichis not encompassed by said first and second compressed parts of the data division,
   said additional division for each word data containing an additional code identifying the combination of compressed parts in said data division for the word data;
   means for reading the word data in the electronic dictionary memory;
   means responsive to said additional code for determining the combination of compressed parts in the data division for each word data read by said reading means; and
   means responsive to said determining means for decoding into the corresponding word the codes of the combination of compressed parts contained in the data division of each word data read by the reading means.

2. The electronic dictionary system according to claim 1, wherein the predetermined order in which the word data are stored is an alphabetical order.

3. The electronic dictionary system according to claim 1, wherein each word data further comprises a delimiter code either indicating the ending place of the word data or indicating both the ending place of the word data and that a predetermined inflection of the word represented by the word data is omitted in the electronic dictionary.

4. The electronic dictionary system according to claim 3, wherein the predetermined inflection is the suffix "s".

5. The electronic dictionary system according to claim 1, wherein each of the first, second and the third sets of codes are selected such that the bit length of each code corresponds to the frequency with which it appears in the stored word data, with the most frequently appearing codes in each set having the shortest bit length.

6. A spell checking apparatus which comprises:
   input means for inputting a word;
   an electronic dictionary memory in which a plurality of word data each representing a word are stored in a predetermined order, and each word data comprises a data division and an additional division,
   said data division for each word data containing a combination of one or more compressed parts selected from among a first compressed part, a second compressed part and a third compressed part, the first compressed part being selected from a first set of codes indicating the number of first characters that are common between the word corresponding to the word data and the word corresponding to the preceding word data stored in the electronic dictionary, the second compressed part being selected from a second set of codes indicating a suffix which appears in the word, and the third compressed part being a sequence of codes selected from a third set of alphanumeric codes, and the sequence of codes respectively representing each alphanumeric character of the corresponding word which is not encompassed by said first and second compressed parts of the data division,
   said additional division for each word data containing an additional code identifying the combination of compressed parts in said data division for the word data;
   means for reading the word data in the electronic dictionary memory;
   means responsive to said additional code for determining the combination of compressed parts in the data division for each word data read by said reading means;
   means responsive to said determining means for decoding into the corresponding word the codes of the combination of compressed parts contained in the data division of each word data read by the reading means;
   checking means for comparing a word inputted by the input means with the decoded word which is decoded by the decoding means; and
   displaying means responsive to said checking means for producing a display dependent upon the result of the comparison by said checking means.

7. The spell checking apparatus according to claim 6, wherein the electronic dictionary system further comprises coding means which converts an inputted word into word data, and storing means for storing the word data produced by said coding means in the electronic dictionary when the inputted word is determined not to exist in the electronic dictionary.

* * * * *